May 28, 1968  W. L. STURGEON  3,385,383
EXPANDING BORING HEAD FOR EARTH AUGER
Filed Aug. 15, 1966
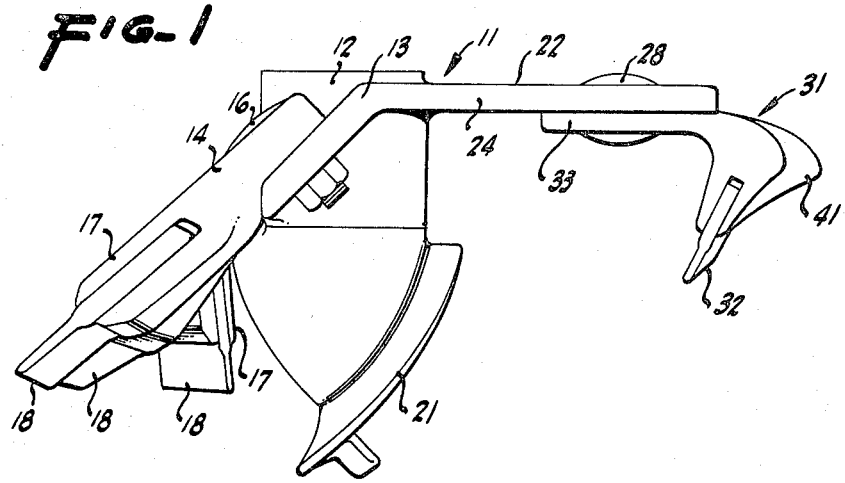
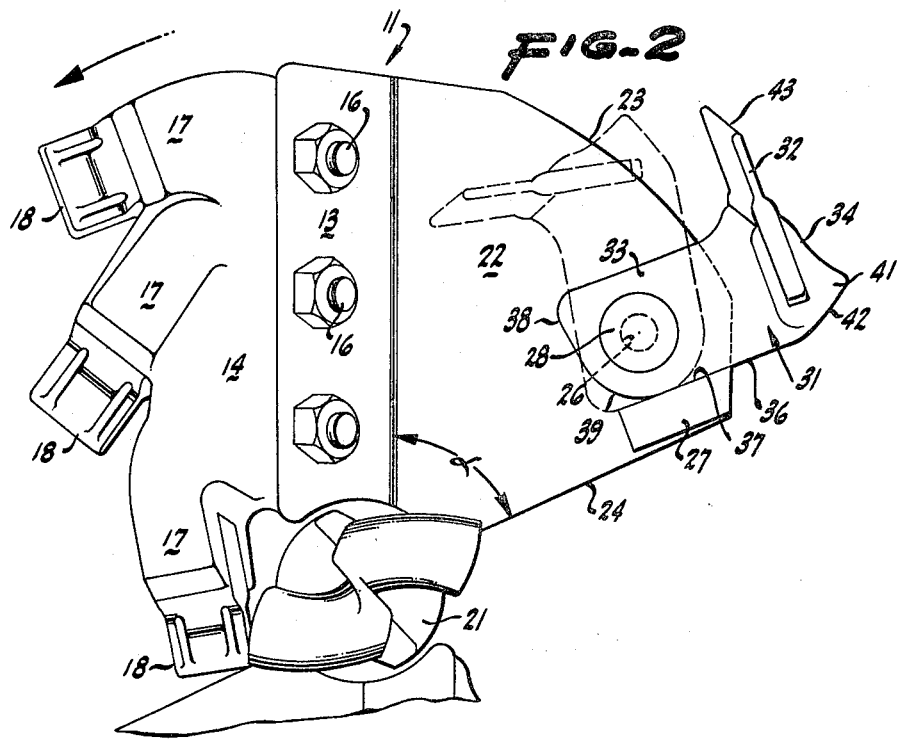
INVENTOR
WALTER L. STURGEON
By
Julian Caplan
ATTORNEY

United States Patent Office 3,385,383
Patented May 28, 1968

3,385,383
EXPANDING BORING HEAD FOR EARTH AUGER
Walter L. Sturgeon, Campbell, Calif., assignor, by direct and mesne assignments, of one-half to Gerald A. Petersen, Sunnyvale, Calif., and one-half to Anita E. Petersen, Saratoga, Calif.
Filed Aug. 15, 1966, Ser. No. 572,577
6 Claims. (Cl. 175—292)

This invention relates to a new and improved expanding boring head for earth auger. More particularly, the present invention comprises a tooth and tooth holder pivotally mounted on a boring head about an axis substantially parallel to the axis of rotation of the boring head but displaced outwardly relative thereto so constructed that the tooth moves between a retracted or inoperative position to a projected or operative position. When the tooth is in operative position the diameter of the hole being bored is greater than when it is inoperative position.

A feature of the present invention is the fact that the tooth moves between its two positions automatically depending upon the direction of rotation of the auger head. This feature permits the head to be inserted through a restricted diameter bore with the tooth in inoperative position and then when the head has passed the restricted area and is being turned in a boring direction, the tooth is forced outwardly to operative position and bores a larger diameter hole than the major digging teeth of the auger would otherwise bore. Upon completion of the boring operation, the head is reversed in direction of rotation and the expanding tooth is automatically retracted permitting the auger to be withdrawn through a restricted diameter area.

A principal advantage of the present invention is in boring holes for pipes, culverts or casings where the pipe, etc. is advanced as the boring operation continues. Thus with the expanding tooth in retracted position the head may be pushed through the pipe. As the boring operation proceeds, a hole of greater diameter than the pipe is formed by reason of the expansion feature of the auger head and this permits the pipe to be pushed forwardly as the boring operation continues. After the boring operation has been completed, the boring head may be reversed in direction and withdrawn through the pipe after the expanding tooth has been retracted.

A principal feature of the invention is the simplicity of construction and the adaptability of the expansion tooth to conventional boring equipment and augers.

A further feature of the invention is the fact that the tooth used in the expansion tooth holder is the same type as used in the principal auger teeth thereby making the tooth interchangeable with other teeth in the auger.

A still further feature of the invention is the fact that the holder for the expansion tooth positions the tooth in its operative position in the most effective cutting angle.

A further feature of the invention is the fact that the tooth holder has a projection so shaped that when the auger is being turned in boring direction, the projection of the holder assists in pulling the tooth out into its operative position and when the auger is being turned in reverse direction the projection facilitates retraction of the holder.

Other objects of the present invention will become apparent upon reading the following specification and referring to the accompanying drawings in which similar characters of reference represent corresponding parts in each of the several views.

In the drawings:

FIG. 1 is a side elevational view of an auger head and associated parts in which the present invention is installed.

FIG. 2 is a bottom plan of the structure of FIG. 1 partially broken away to conserve space.

The auger head 11 shown in the present invention is in certain respects similar to that shown in Petersen Patent No. 2,578,014. A central hub 12 is provided and formed with an aperture (not shown) for attachment to the stem of an auger (not shown). Head 11 has a radially projecting downwardly-forwardly turned arm 13 to which a tooth holder plate 14 is attached by bolts and nuts 16. Plate 14 is subject to considerable variation but as shown herein there are holders 17 for three teeth 18. The holders 17 are so located and positioned on plate 14 as to accomplish a very effective digging action. Reference is made to Petersen Patent No. 2,578,014, which discloses an extremely effective positioning of the cutting teeth. Although not shown in the accompanying drawing, there are two diametrically opposed arms 13 on hub 12 and the teeth on each side are staggered as is disclosed in the last mentioned patent. The means whereby teeth 18 are retained in tooth holder 17 and the shape of the teeth is subject to considerable variation, but a preferred means of attachment is shown in Patent 2,968,880.

In FIG. 1 the boring head 11 is shown for vertical downward digging and to facilitate such operation a pilot bit 21 is attached to the lower end of hub 12 by means not shown. Reference is made to Patent 2,773,673 for a preferred form of pilot bit. Although the drawings show the head used for vertical boring, it will be understood that by tipping the axis of rotation of hub 12 by 90° the same device may be used for horizontal drilling and that by tilting the axis at other angles slant drilling may be achieved. However, for the purpose of the following description, it will be assumed that the axis of rotation of hub 12 is vertical.

The portions of the invention heretofore described are conventional in earth auger construction. In accordance with the present invention, a horizontal platform 22 projects rearwardly of the direction of rotation of the hub from the upper edge of arm 13. For a considerable portion of its periphery the outside edge 23 of platform 22 is arcuate having its center of curvature on the axis of hub 12. The angular extent of platform 12 as shown by angle alpha in FIG. 2 is preferably about 83° and the trailing edge 24 is approximately radial. The radius of edge 23 is slightly less than the radius of the hole being bored by the three teeth 18 in normal operation of the auger. Displaced forwardly of edge 24 is a hole 26 having its axis parallel to the axis of hub 12. Rearward of hole 26 on the bottom surface of platform 22 is a lug 27. Pivoted by means of rivet 28 or other means passing through hole 26 is a holder 31 for the expansion tooth 32. Holder 31 has a horizontal inner portion 33 through which rivet 28 passes and an outer tooth holder portion 34 shaped to receive the proximal end of tooth 32. Tooth 32 may be similar in construction to teeth 18. One edge 36 of portion 33 abuts the forward face 37 of lug 27 in the expanded or solid line position of holder 31 shown in FIG. 2, and thus lug 27 limits outward movement of tooth 32. Another surface 38 of portion 33 contacts surface 37 in the retracted position of the tooth and thus limits inward movement of the holder 31. Intermediate surfaces 36 and 38 is an arcuate surface 39 having its center of rotation about the center of hole 26. Thus the holder 31 can pivot between retracted and extended positions. In order automatically to achieve the movement of holder 31 between its two positions, a toe or extension 41 is formed therein curved and shaped so that it is outermost in either the retracted or projected positions of holder 31. Thus when the tooth 32 is retracted and the head 11 is turned counterclockwise as viewed in FIG. 1 in a boring direction, the toe 41 frictionally contacts the side of the hole being bored and as rotation continues the tooth 32 is forced outwardly. It will further appear that the position of the tooth likewise facilitates such outward movement. On the other hand, when the tooth is in projected position and the head 11 is turned in a reverse or clockwise direction, the flank 42 of toe 41 contacts the side edge of the hole being bored and forces the tooth inwardly to retracted position. It will thus be seen that by changing the direction of rotation of the head 11 the tooth 32 and holder 31 can be automatically changed between retracted and projected position, a feature of considerable importance when the auger head is boring a considerable distance below the surface.

Holder 34 is so skewed relative to the axis of rotation of hub 12 that in its projected position the cutting edge 43 of tooth 32 is in a most effective position relative to the hole being dug. Thus tooth 32 is slanted downwardly at about a 30° angle relative to the horizontal and further the outer corner of the cutting edge 43 is slanted outwardly relative to the inner corner thereof at about 30°. The outer corners of the cutting edge 43 thus both contact the diameter of the expanded hole being bored and by reason of the fact that said diameter is extensive relative to the width of edge 43, in practical effect the entire width of edge 43 digs the side wall of the hole.

One preferred use of the structure described herein is in boring a hole for pipe, culvert or casing. At the commencement of operation the holder 31 is swung inward to retracted position and when thus retracted fits within the inside diameter of the pipe so that the head can be pushed to the end of the pipe with the axis of hub 12 coinciding with the axis of the pipe. Thereupon, the head 11 is turned in a counterclockwise direction as viewed in FIG. 2 and toe 41 engages the sidewall of the hole being dug by the teeth 18 and moves the side tooth holder 31 outward to projected position causing the cutting edge 43 of tooth 32 to bore an enlarged diameter hole. The pipe or casing can be advanced behind the tooth 32 as the boring operation continues. When the boring operation is completed, the head 11 is reversed in rotation and the flank 42 of toe 41 engages the side of the hole which has been bored and forces the holder 31 into retracted position. Thereupon, the head may be pulled back through the pipe without the necessity of removal of the pipe.

What is claimed is:

1. An expanding boring head comprising a hub, at least one arm projecting from said hub, first means on said arm for attaching a plurality of fixed teeth for rotation with said hub, second means on said arm disposed rearward of said first means in the direction of rotation of said hub for digging action, an expansion tooth-holder for attachment of an expansion tooth, third means pivotally mounting said expansion tooth-holder on said second means for movement between a retracted position and an expanded position, said expansion tooth-holder having an outward projecting toe projecting beyond the periphery of said second means when said expansion tooth-holder is in retracted position, whereby upon rotation of said hub for digging action said toe engages the side of the hole being dug to pivot said expansion tooth-holder to expanded position.

2. An expanding boring head according to claim 1, in which said toe is positioned to engage the side of the hole being dug when said hub is rotated in reverse direction to pivot said expansion tooth-holder to retracted position.

3. An expanding boring head according to claim 1, which further comprises a lug on said second means positioned along the trailing edge of said second means, said expansion tooth-holder having two angularly related surfaces, one said surface engaging said lug to limit retracted movement and the other said surface engaging said lug to limit movement of said expansion tooth-holder in a projected direction.

4. An expanding boring head according to claim 1, in which said second means is in a plane substantially transverse to the axis of rotation of said hub and said third means is parallel to said axis.

5. A head according to claim 1, which further comprises an expansion tooth and means for retaining said expansion tooth in said expansion tooth-holder, said expansion tooth-holder formed skewed to direct said expansion tooth, when said expansion tooth-holder is in expanded position, outwardly and axially forwardly relative to the axis of rotation of said hub.

6. A head according to claim 5, in which said fixed teeth and said expansion tooth are substantially identical in construction and interchangeable.

References Cited

UNITED STATES PATENTS

| 2,578,014 | 12/1951 | Petersen | 175—392 |
| 2,863,640 | 12/1958 | Petersen | 175—392 X |
| 2,912,228 | 11/1959 | Kandle | 175—292 |
| 2,990,896 | 7/1961 | Kandle | 175—292 X |

FOREIGN PATENTS 452,955  11/1927  Germany.

ERNEST R. PURSER, *Primary Examiner.*

NILE C. BYERS, *Examiner.*